April 19, 1927.
S. W. FISH
1,625,116
MULTIPLE TOOL SPINDLE MACHINE
Filed Aug. 28, 1922     3 Sheets-Sheet 1
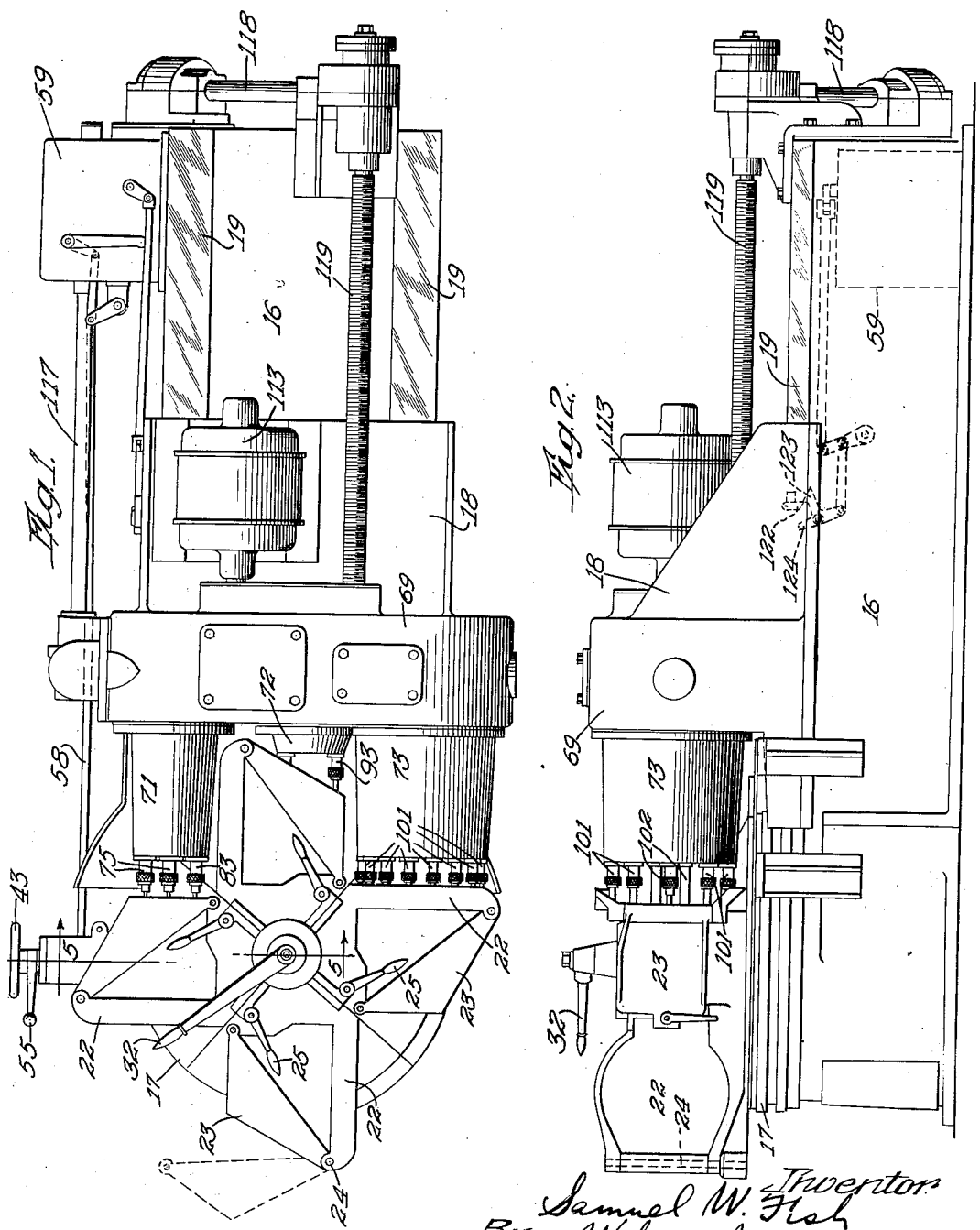

April 19, 1927.
S. W. FISH
1,625,116
MULTIPLE TOOL SPINDLE MACHINE
Filed Aug. 28, 1922   3 Sheets-Sheet 2
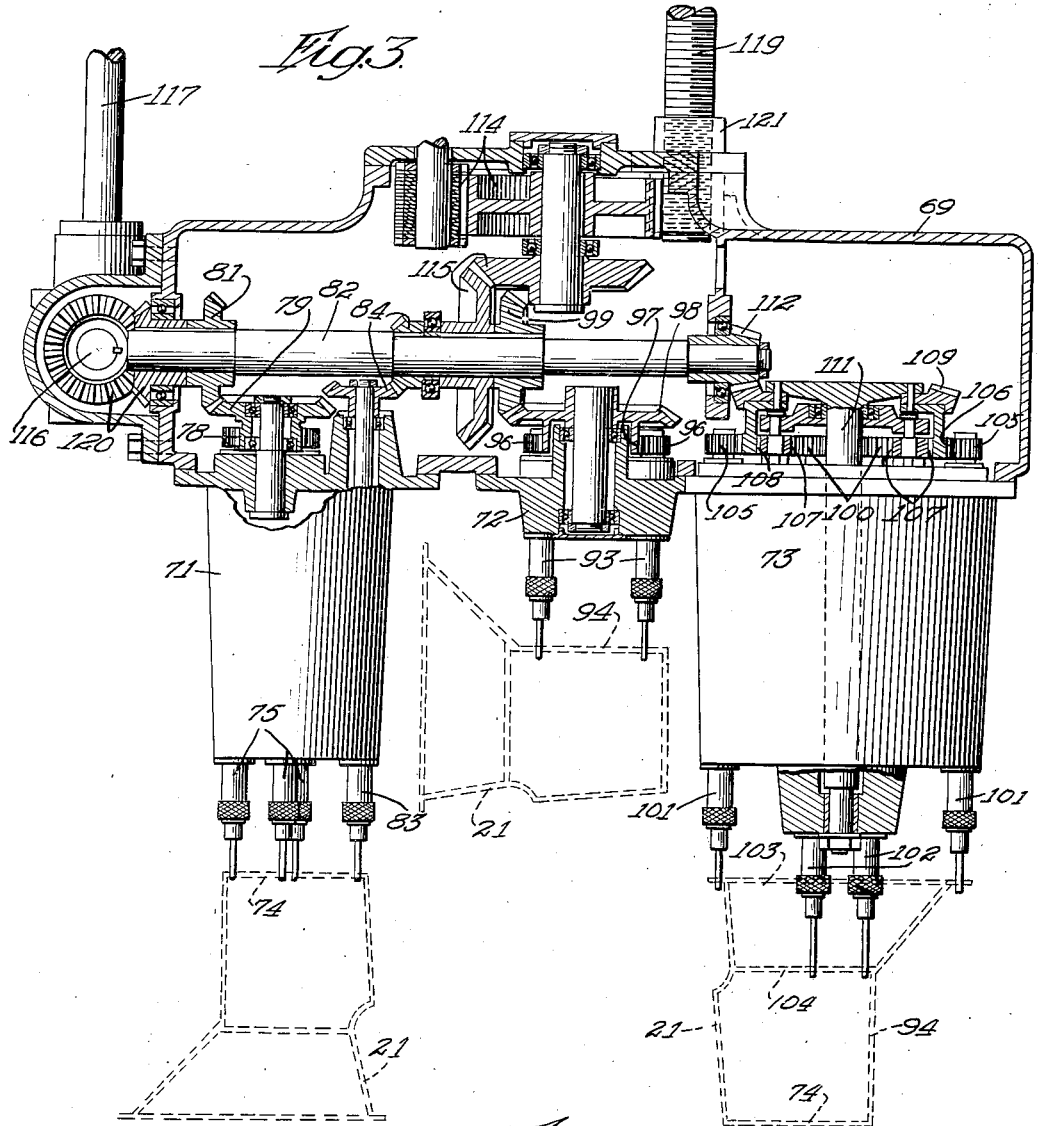
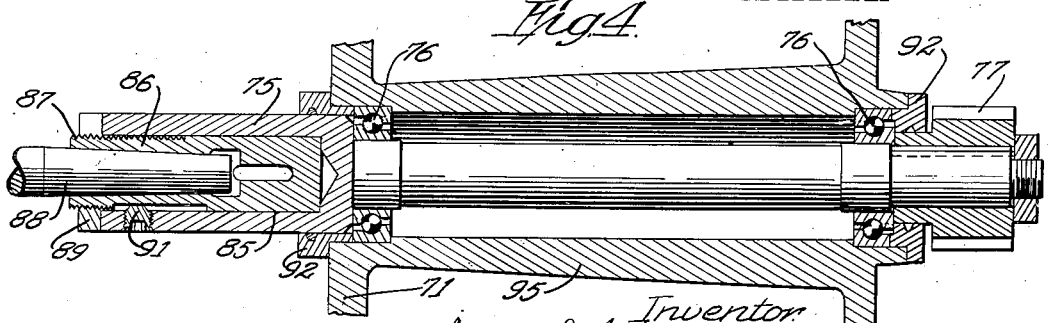

April 19, 1927. 1,625,116
S. W. FISH
MULTIPLE TOOL SPINDLE MACHINE
Filed Aug. 28, 1922 3 Sheets-Sheet 3
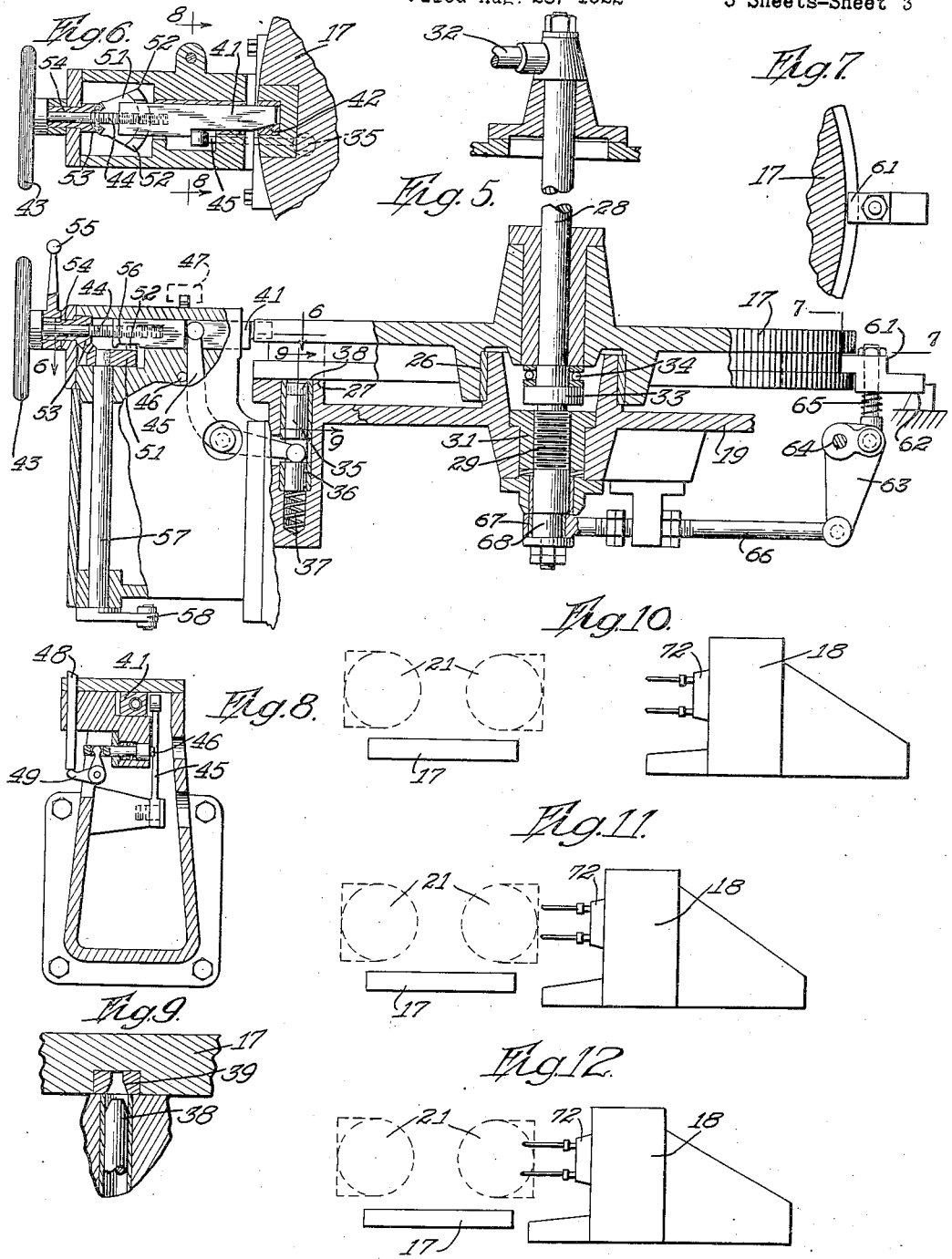

Patented Apr. 19, 1927.

1,625,116

UNITED STATES PATENT OFFICE.

SAMUEL W. FISH, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MULTIPLE-TOOL-SPINDLE MACHINE.

Application filed August 28, 1922. Serial No. 584,738.

This invention refers in general to machines having a number of tool spindles adapted for simultaneous operation on a number of work-pieces. It has more particular reference to multiple spindle drilling machines, but is applicable to other tooling and adapted as a special purpose machine to those cases in which one or more operations are to be performed on a work-piece at different stations.

The primary object of the present invention is to provide a multiple spindle machine characterized by its novel principles of operation, whereby a number of machining operations are simultaneously performed on different sides of a number of work-pieces located at different stations on a rotary carrier, and whereby upon indexing the carrier to advance the work-pieces to the next succeeding stations different sides of such work-pieces will be presented to the tools to be machined thereby. As a result of such principle of operation, a number of machining operations may be uniformly and accurately performed in a comparatively short time and at a low cost.

My invention is of special utility in connection with drilling a number of holes in different sides of a work-piece or performing any other machining operations in a similar manner by means of rotary tool spindles.

One of the characteristics of my invention resides in the novel relation of the work to the tool carriers. The work-carrier has circumferentially spaced work-fixtures and is adapted to be indexed to successively move each work-piece from station to station, at one of which the work-pieces are loaded and unloaded. The tool-carrier has a plurality of tool spindles in a plane at right angles to the axis of rotation of the work-carrier and in laterally spaced planes in alignment with work-pieces at different stations. Provision is made for effecting relative movement between said carriers in the plane of rotation of the work-carrier, whereby the tools will be simultaneously brought into operation on different sides of the respective work-pieces at different stations. During the drilling operation, at least one of the fixtures is at a loading station at which the finished work-piece is removed and a new piece placed in the fixture.

Other objects of my invention consist, briefly stated, in providing an improved multiple spindle drilling machine which embodies a novel arrangement of work-fixtures and tool spindles, and novel mechanism for indexing the work fixtures and for rotating and feeding the tool spindles.

Other objects and attendant advantages will be appreciated by those skilled in this art as the invention becomes better understood by reference to the following description when considered in connection with the accompanying drawings, in which—

Figure 1 is a plan view of a multiple tool spindle machine embodying my invention;

Fig. 2 is a side elevation of the machine;

Fig. 3 is an enlarged top view partly in horizontal section of the spindle heads and the spindle-driving mechanism;

Fig. 4 is a longitudinal section through one of the tool spindles;

Fig. 5 is a fragmentary vertical sectional view through the mechanism for indexing the work-carrier or table, taken substantially on the line 5—5 of Fig. 1;

Figs. 6 and 7 are horizontal sections taken substantially on the lines 6—6 and 7—7, respectively, of Fig. 5;

Fig. 8 is a vertical sectional view taken substantially on the line 8—8 of Fig. 6;

Fig. 9 is a vertical sectional view taken substantially on the line 9—9 of Fig. 5; and Figs. 10, 11 and 12 are diagrammatic views showing the tool carrier at different stages in its travel.

In illustrating the principles of my invention, I have taken as an example their application to a machine of the horizontal type, so called by reason of the horizontal feed of the tools. It should be understood, however, that my invention is in no way limited to this particular type, but is capable of embodiment in other forms, such for example as in a vertical type. Furthermore, I have in the present instance illustrated the tool spindles as equipped with drills, whereas any machine tools adapted to be rotated by spindles might be employed.

My invention also contemplates the machining of work-pieces of any character in which it is desired to drill or otherwise machine different sides of the work-piece. In the instant case, I have shown fixtures for carrying work-pieces in the form of transmission housings or casings and an arrangement of tool spindles for drilling a number of holes in three sides of each casing. It will be understood as the description progresses that my invention comprehends machining in the manner described, of workpieces of various description and the provision of appropriate fixtures for the different work-pieces.

Referring more particularly to the drawings, especially to Figs. 1 and 2, it will be seen that I have provided an elongated bed designated generally by 16, upon one end of which is mounted for rotation about a vertical axis, a work-carrier or table 17. A tool carrier or carriage designated generally by 18, is mounted to slide horizontally on ways 19 on the opposite end of the bed toward and from the work-carrier to bring the tools into and out of operation. The construction and arrangement of the work-fixtures, the means for indexing the work-carrier, and the mechanism for driving and feeding the tool spindles will be described in order.

The work-carrier or table is at present equipped on its top with four circumferentially spaced fixtures, each of which is adapted to carry a work-piece such as a transmission casing 21. Each fixture comprises a stationary part 22 and a clamping part 23 hinged at 24 to the stationary part, and adapted to be swung on said hinge to an open position in which the work-piece may be placed in the fixture, and to a closed position for clamping and securing the work-piece against displacement from the fixture. Suitable means may be employed for clamping and locking the hinged part 23 in the closed position, this means (not shown) being at present operated by a hand lever 25. The work-carrier is adapted to be indexed in step by step movements to advance the work-pieces from one station to another at which machining operations will be performed, and at one of which, termed the loading station, the finished work-piece will be removed from the fixture and a new work-piece substituted therefor. The loading station at present is at the end of the machine remote from the tools, it being observed that in this position there is plenty of freedom for the operator to load and unload the fixture.

The mechanism for indexing the work-carrier and locking it in indexed position is best shown in Figs. 5 to 9 inclusive. In this connection it shoud be borne in mind, however, that my invention in its broad aspect is in no way limited to the particular means herein disclosed for indexing and locking the work-carrier, but contemplates the use of any suitable or preferred means to this end, or for imparting rotary motion to such carrier. As shown in Fig. 5, the work-carrier 17 has a central bearing 26 on the bed and is revoluble about this bearing. The work-carrier is also capable of a slight vertical movement on said central bearing to raise its marginal portion from the horizontal bearing or supporting surface 27 upon which said carrier normally rests. Manually operable means is provided for elevating and lowering the work-carrier, comprising at present a vertical shaft 28 co-axial with the carrier and having a threaded portion 29 engaged in a nut 31 fixed with respect to the bed 19. By means of a handle or lever 32 fixed to the upper end of the shaft 28, rotative movement may be imparted to the latter to feed it upwardly in the nut 31 sufficiently to raise the work-carrier from the bed, the lifting thrust being transmitted through a collar 33 fixed to the shaft 28 and an anti-friction thrust bearing 34 interposed between said collar and the work-carrier. When said carrier is supported solely on the bearing 34, it may be easily swung about its axis to advance the work-pieces from station to station. In the present construction, the operator grasps the work-fixture and swings the work-carrier by hand, or in other words, indexes by hand.

An approximate stop pin 35 is provided for stopping the work-carrier when it has been moved a quarter of a revolution, which in the present instance is the extent of each indexing movement by reason of the fact that four equally spaced work-fixtures are employed. This stop pin, vertically slidable in a bearing 36 in the bed, is constantly urged upwardly by a compression spring 37, so that the tapered upper end 38 of the pin will bear against the underside of the work-carrier and enter a socket 39, one of which is provided for each work-fixture, thereby stopping the carrier at the working position.

A lock pin 41 when entered in a socket 42 in the periphery of the work-carrier, serves to lock the latter in operative position. This lock pin is at present adapted to be fed into and out of locking position by operation of a hand wheel 43 fixed to a screw 44 threadingly engaged with said pin. By moving said lock pin inwardly, it will through means of a bell crank lever 45, withdraw the stop pin 35 from the work-carrier, as is plainly shown in Fig. 5. When the lock pin is withdrawn from the work-carrier preparatory to indexing the latter, the bell crank lever 45 will be held in the position shown, by a latch 46, which in turn is adapted to be released just prior to the time the next succeeding socket 39 reaches the stop pin. Said latch will be released by a dog 47 moving with the work-carrier, which dog depresses a plunger 48, and the latter actuates a bell crank lever 49 which in turn withdraws the latch 46 from the lever 45, thereby permitting the spring 37 to enter the stop pin 35 in the socket 39.

At this point it will be noted that the lock pin 41 serves as a safety factor for preventing the operator from putting the tool-carrier into motion until after the work-carrier has been rigidly locked in operative position. In other words, when the lock pin is withdrawn it prevents operation of the control means employed for advancing the tool-carrier. This safety means comprises a segmental member 51 disposed beneath the outer end of the lock pin 41 and having a raised abutment 52 at each side of said pin. Said member 51 has segmental teeth meshing with a segmental gear 53 fixed to a sleeve 54 loose on the screw 44 and carrying a fixed upstanding hand lever 55 adapted to be operated for putting certain mechanism into operation for advancing the tool-carrier as will be explained more fully hereinafter. The lock pin 41 is notched at 56 on its underside so that when said pin is in locked position, the abutments 52 may pass through said notch by operation of the hand lever 55; and when the lock pin 41 is withdrawn, the abutments 52 will prevent operation of the hand lever 55. Said lever 55 is adapted to oscillate the shaft 57, which in turn is connected with a rod 58, which controls certain mechanism contained in a gear box 59 which will be presently referred to.

The act of lowering the work-carrier by backing down the screw 29 by partial rotative movement imparted by the lever 32, serves to clamp to the bed that side of the work-carrier disposed adjacent to the tools, thereby resisting the thrust imposed by the pressure of the tools against the work-pieces. This result may be obtained in various ways and at present I employ a clamping member 61 fulcrumed on a fixed point 62 and engaged at its opposite end in an annular groove in the periphery of the work-carrier. This member is adapted to be drawn downwardly for clamping the work-carrier to the bed, the means employed for this purpose being a bell crank lever 63 fulcrumed at 64 and connected at one end by means of a link 65 to the clamp 61, and at its opposite ends by means of a link 66 connected to a band 67 which embraces an eccentric 68 on the lower end of the shaft 28. It will be manifest that the clamping action will be released and applied upon raising and lowering the work-table, respectively.

Referring now to the construction and operation of the tool-carrier, it will be seen, viewing Figs. 1 and 3, that it is shaped to provide an upstanding housing 69 reaching transversely across the bed. On the front of this housing are mounted three spindle-carrying heads designated generally by 71, 72 and 73 disposed in a common horizontal plane and spaced apart laterally in alignment with the work-pieces in three of the work-fixtures. Each head is adapted to carry one or more tool spindles, and at present each is equipped with a group of such spindles arranged for drilling certain holes in the side of the work-piece presented to the tools. The first side of the work-piece presented to the tools after leaving the loading station, is the rear end wall 74 through which it is desired to drill a plurality of holes at predetermined points. To this end, the head 71 is equipped with a plurality of tool spindles designated generally by 75, a typical section through which is shown in Fig. 4. These spindles may be of any suitable or preferred construction, and at present each is journaled at its inner and outer ends in combined radial and thrust bearings 76 and is equipped at its inner end with a fixed spur gear 77. These spur gears mesh with a spur gear 78 suitably journaled on the inner end of the head 71 and in fixed co-axial relation with a bevel gear 79. This bevel gear meshes with a companion gear 81 fixed to a horizontal drive shaft 82 suitably journaled in the housing 69 transverse to the plane of the spindles. One of the spindles 83 carried by the head 71 has a separate driving connection with the shaft 82 through the agency of bevel gears 84.

While any suitable spindle construction may be employed, I prefer to use that shown in Fig. 4, in which the outer end of the spindle is enlarged to provide a socket 85 in which is located a sleeve 86 having a tapered socket 87 for the reception of either a tool or a tool chuck, the tapered shank of which is indicated by 88. A split nut or thrust collar 89 threadingly engaged on the outer end of the sleeve 86 serves to take the thrust of the tools against the spindle and may be expanded and then adjusted to advance the sleeve, and consequently the tool, when setting the same in relation to the work. A set screw 91 locks the sleeve in position against rotation. Grease glands 92 at the inner and outer ends of each spindle serve to retain the lubricant from working out of the spindle head.

The spindle head 72 is set back from the head 71 so that the tools carried by the spindles 93 will enter the top wall 94 of the work-piece at different stations substantially simultaneous with the entrance of the tools in the wall 74 at the first station. The spindles 93 are similar to those shown in Fig. 4, although in any instance the reinforcing and oil retaining wall 95 disclosed therein is not essential, because the spindle bearings are carried by the inner and outer ends of their respective heads. The spur gear 96 on the inner end of each spindle 93 meshes with a spur gear 97 journaled on the head 72 and fixed with respect to a bevel gear 98 which meshes with a complemental gear 99 fixed to the drive shaft 82.

The head 73 carries two groups of spindles designated respectively by 101 and 102, the drills of which are adapted to bore through the front and intermediate walls 103 and 104 respectively, of the work-piece located at the third station. These tool spindles are likewise arranged so that their tools will enter the work-piece simultaneously with the previously described tools and are constructed and driven similarly thereto with the exception that the spur gears 105 on the circumferentially spaced spindles 101 mesh with an external spur gear 106, while the gears 100 on the spindles 102 mesh with idler gears 107 which in turn mesh with an internal gear 108 integral with the gear 106. The combined gears 106 and 108 are fixed to a bevel gear 109, which in turn is fixed to a shaft 111 journaled centrally in the head 73. The bevel gear 109 meshes with a bevel gear 112 fixed to the drive shaft 82. An electric motor 113 mounted on the tool-carrier drives the shaft 82 through the agency of spur gears 114 and bevel gears 115. It is evident that all of the spindles will be simultaneously driven by the drive shaft 82 which is disposed in diametrical relation to the co-axial bevel and spur gears centrally disposed on each spindle-carrying head for driving the several spindles.

Mechanism is provided for moving the tool-carrier back and forth on the ways 19 preferably in rapid approach, feed and rapid reverse movements. The particular means to this end is not important, and for this reason I have illustrated briefly only the line of drive without showing in detail the mechanism by which changes in speed and reversal of drive are effected. Power for this purpose is taken from one end of the drive shaft 82 and transmitted through bevel gears 120 to a vertical shaft 116, journaled in a casing extension on the adjacent end of the housing 69 and from this shaft through bevel gears, not shown, to a horizontal shaft 117 which enters the gear box 59 mentioned above. The bevel gear on the shaft 117 is splined thereon to allow for travel of the tool-carrier. The change speed and reversing mechanism contained in the gear box 59 may be of any suitable or preferred construction. The driven shaft in said gear box has geared connection with a shaft 118 which is connected by gears to a feed screw 119, which is threaded in a fixed nut 121 on the tool-carrier. The control rod 58 mentioned above is adapted to be operated for starting the tool carrier in its rapid approach movement from the retracted position shown in Fig. 10, and when the tools are in close proximity to the work-pieces, as shown in Fig. 11, a dog 122, (Fig. 2) on the tool-carrier will actuate a lever 123, which in turn will actuate mechanism in the gear box for changing the speed to a slow feed, at the end of which, shown in Fig. 12, said dog 122 will actuate the end 124 of said lever and establish the rapid reverse speed, thereby returning the tool carrier to the starting position at which it will be automatically stopped.

The general operation is as follows: Assuming that the motor is in operation and the tool carrier is in the retracted position, the operator places a work-piece 21 in the fixture at the loading station, indexes the work-carrier by hand by swinging it in a clockwise direction viewing Fig. 1, until the work-piece has reached and been stopped at the first station, opposite the spindle head 71. At this station the operator will lower the work-carrier onto the bed and then lock it by the lock pin 41 as described above. The operator then by operation of the control lever 55 causes the tool-carrier to be fed forwardly and to continue through its cycle of movements, during which the drills in the spindles 75 and 83 will be brought into operation on the rear wall 74 of the work-piece and retracted. During the travel of the tool-carrier the operator will load the fixture at the loading station, and after completion of the tool-carrier cycle will index the work-carrier as described, thereby advancing the first mentioned work-piece to the second station. The tool carrier will be put into operation again, and the tools carried by the spindle heads 71 and 72 will simultaneously operate on the work-pieces at the first and second stations. The loading and indexing operation will be repeated, and upon the next feed of the tools they will simultaneously operate on the work-pieces at three stations, each work-piece being machined on a different side.

It is believed that the present machine is unique by reason of the relative relation of the spindle heads and work-fixtures and by the feed of the tools in the plane of rotation of the work-fixtures so as to bring the tools into operation on different sides of said work-pieces located at the different stations. In other words, the multiple spindle tool-carrier moves in a plane at right angles to the axis of rotation or the index axis of the work-carrier and the spindle heads are arranged in alignment with the work-pieces at the different stations so as to perform the machining operations simultaneously on the work-pieces at said stations. It should be understood that the foregoing arrangement and relative movement of the work and tool-carriers may as contemplated by this invention, be performed by any mechanical expedient, and that the invention is in no way limited to the particular means herein disclosed to this end. It will be evident therefore, that considerable change might be made in the construction and arrangement of parts without departing from the spirit and scope of the invention as expressed in the appended claims.

I claim:

1. A multiple-spindle metal-working machine comprising, in combination, a work-carrier adapted to carry work-pieces in circumferentially spaced relation and to be indexed for moving the work-pieces from station to station, a tool-carrier adapted to travel back and forth in a plane at right angles to the index axis of the work-carrier and having a gear housing the front wall of which faces the work-carrier in a plane at right angles to the travel of the tool-carrier, a plurality of spindle heads detachably mounted on said front wall in alignment with work-pieces at different stations, one or more spindle-driving parts extending between and into each spindle head and the gear housing, and gear mechanism within said housing for driving said spindle-driving parts.

2. A multiple-spindle metal-working machine comprising, in combination, a work-carrier adapted to carry work-pieces in circumferentially spaced relation and to be indexed for moving the work-pieces from station to station, a tool-carrier adapted to travel back and forth in a plane at right angles to the index axis of the work-carrier and having a gear housing the front wall of which faces the work-carrier in a plane at right angles to the travel of the tool-carrier, said front wall having a plurality of openings in alignment with work-pieces at spaced stations, spindle heads adapted to be detachably mounted on said front wall at locations defined by said openings and having spindle connected parts extending through said openings into said gear housing, and gear mechanism within said housing for driving said spindle connected parts.

3. A multiple-spindle metal-working machine comprising, in combination, an elongated frame having parallel ways at one end and circular ways at the other end; an index work-table mounted on the circular ways and equipped with means for carrying work-pieces in circumferentially spaced relation, with work-pieces at diametrically opposed stations and at an intermediate station in position to be machined; a tool-carrier comprising a base portion slidable on said parallel ways toward and from the work-table, a housing on said base portion extending transversely of said ways providing support for a plurality of spindle-carrying heads and a casing for spindle-driving gearing, a plurality of spindle-carrying heads detachably mounted on the said housing one in alignment with each of the above-mentioned stations, one or more tool spindles journaled in each head and equipped at one end for attachment of a tool and at its opposite end with a gear within the housing, and gearing within the housing for driving the spindle gears; mechanism for propelling the tool-carrier on its ways in rapid approach, feed and rapid return movements; and means whereby the work-table may be indexed between the return and approach movements for advancing the work-pieces in succession into alignment with the respective spindle heads.

4. A multiple-spindle metal-working machine comprising an elongated bed having parallel horizontal ways and a horizontal circular table support; an index work-table on said support adapted for carrying work-pieces in circumferentially spaced relation and to be indexed about a vertical axis; a tool-carrier comprising a base portion mounted to slide on said parallel ways and having an upstanding housing providing a spindle head support and a casing for spindle-operating gearing, a plurality of spindle heads removably mounted on said housing in alignment with work-pieces at different stations, and gearing in said casing for revolving the spindles; means for propelling the tool-carrier back and forth on its ways to move its tools into and out of operation; and means whereby the work-table may be indexed to move its work-pieces in succession into alignment with the respective spindle heads.

5. A multiple-spindle metal-working machine comprising, in combination, an elongated base having horizontal parallel ways at one end and a table support at the other end; a work-table mounted on said support to index about a vertical axis and equipped to carry work-pieces at diametrically opposed stations transverse to said ways and at an intermediate station intermediate and adjoining said ways; a tool-carrier comprising a base portion mounted to slide on said ways toward and from the work-table, an upstanding housing fixed on said base portion and having an upright front wall provided with an opening in alignment with each of said stations, a spindle-carrying head for each station equipped with one or more tool spindles each of which has a gear at one end, means for detachably mounting each spindle-carrying head in connection with the housing with its spindle gears communicating with the interior of said housing through one of said openings in the front wall thereof, and gearing within the housing for driving the spindle gears; mechanism for propelling the tool-carrier back and forth on its ways to move the tools into and out of operation; and means whereby the work-table may be indexed to advance the work-pieces in succession to each tool station.

6. A multiple-spindle metal-working machine of the character described comprising, in combination, a bed structure having horizontal parallel ways at one end and horizontal circular ways at the opposite end, a work-table mounted on said circular ways and adapted to be indexed about a vertical axis, a tool-carrier mounted to travel back and forth on said parallel ways toward and from the work-table and having an upstanding gear housing the front wall of which faces the work-table, a plurality of spindle heads mounted on said front wall, one in line with the index axis of the work-table and one spaced laterally from each side thereof, said laterally spaced spindle heads being elongated and each having one or more front and rear spindle bearings, tool spindles mounted in the bearings in said spindle heads, gearing within the gear housing for driving said tool spindles, and mechanism for propelling the tool-carrier toward and from the work-table.

7. In a multiple-spindle metal-working machine of the character described, in combination, a work-table equipped with a fixture for carrying work-pieces in quarterly spaced relation, a tool-carrier mounted to travel toward and from the work-table in a plane at right angles to the index axis thereof, three spindle heads detachably mounted on said gear housing in a common plane and spaced apart laterally in line with work-pieces at three adjoining stations, the outermost spindle heads being elongated so as to reach over the work-table and each having one or more spindle bearings at the front and rear end, tool spindles mounted in the bearings in said spindle heads, and mechanism including gearing within the gear housing for driving the tool spindles.

8. In a multiple-spindle metal-working machine of the character described, in combination, a work-table equipped with a fixture for carrying work-pieces in quarterly spaced relation, a tool-carrier mounted to travel toward and from the work-table in a plane at right angles to the index axis thereof, three spindle heads detachably mounted on said gear housing in a common plane and spaced apart laterally in line with work-pieces at three adjoining stations, the outermost spindle heads being elongated so as to reach over the work-table and having spindle bearings at the front and rear end for one or more tool spindles, tool spindles mounted in the bearings in said spindle heads, and mechanism including gearing within the gear housing for driving the tool spindles, the tool spindles being so mounted and said mechanism being so constructed that any spindle head may be removed from the front of the gear casing independently of the others without disturbing said gear mechanism.

9. A multiple-spindle metal-working machine of the character described comprising, in combination, a bed structure having horizontal parallel ways and horizontal circular ways in adjoining relation, a work-table mounted on the circular ways to index about a vertical axis, a tool-carrier mounted to slide on the parallel ways toward and from the work-table, said tool-carrier having a gear housing the front wall of which is in a plane at right angles to its travel and faces the work-table, a spindle driving shaft within the gear housing parallel with said front wall, and a plurality of spindle heads carried on said front wall in line with different work stations and each equipped with one or more tool spindles geared to said spindle driving shaft.

10. A multiple-spindle metal-working machine comprising, in combination, a bed structure having horizontal parallel ways at one end and horizontal circular ways at the other end, a work-table mounted on said circular ways to index about a vertical axis and equipped to carry work-pieces in quarterly spaced relation whereby the work-pieces will be moved in succession from station to station by indexing the work-table, said stations being so located as to provide diametrically opposed work stations in a plane at right angles to said parallel ways and a work station intermediate said spaced work stations and adjoining said parallel ways and an unloading station diametrically opposed from said intermediate work station, a tool-carrier adapted to travel back and forth on said parallel ways, a plurality of spindle heads mounted on the tool-carrier, one in alignment with each work station, the outermost spindle heads having spindle bearings at the front and rear ends for one or more tool spindles, tool spindles mounted in the spindle heads, mechanism for rotating the tool spindles, and means whereby the tool-carrier may be propelled on its ways in a feed and a return movement.

SAMUEL W. FISH.